No. 767,712. Patented August 16, 1904.

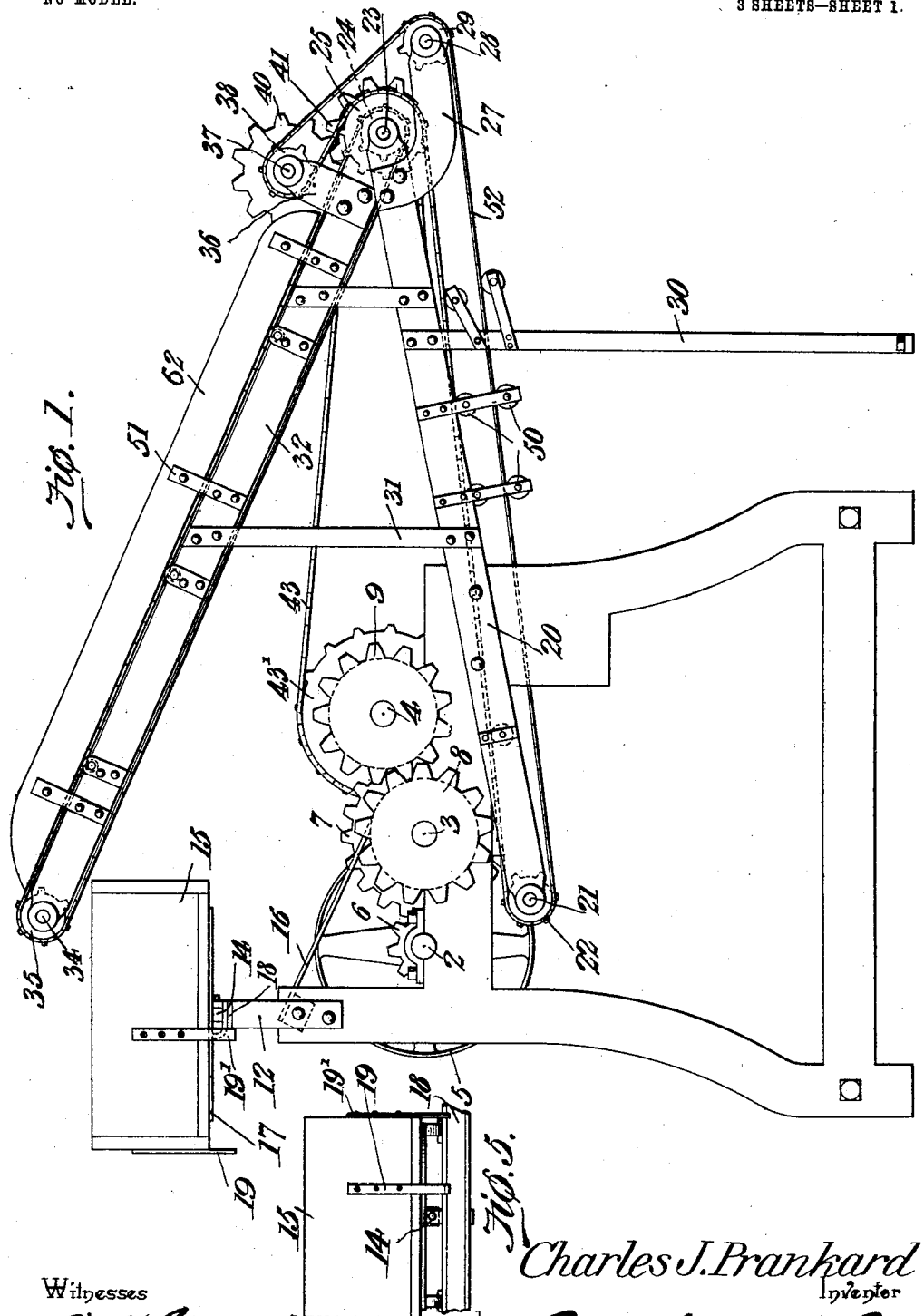

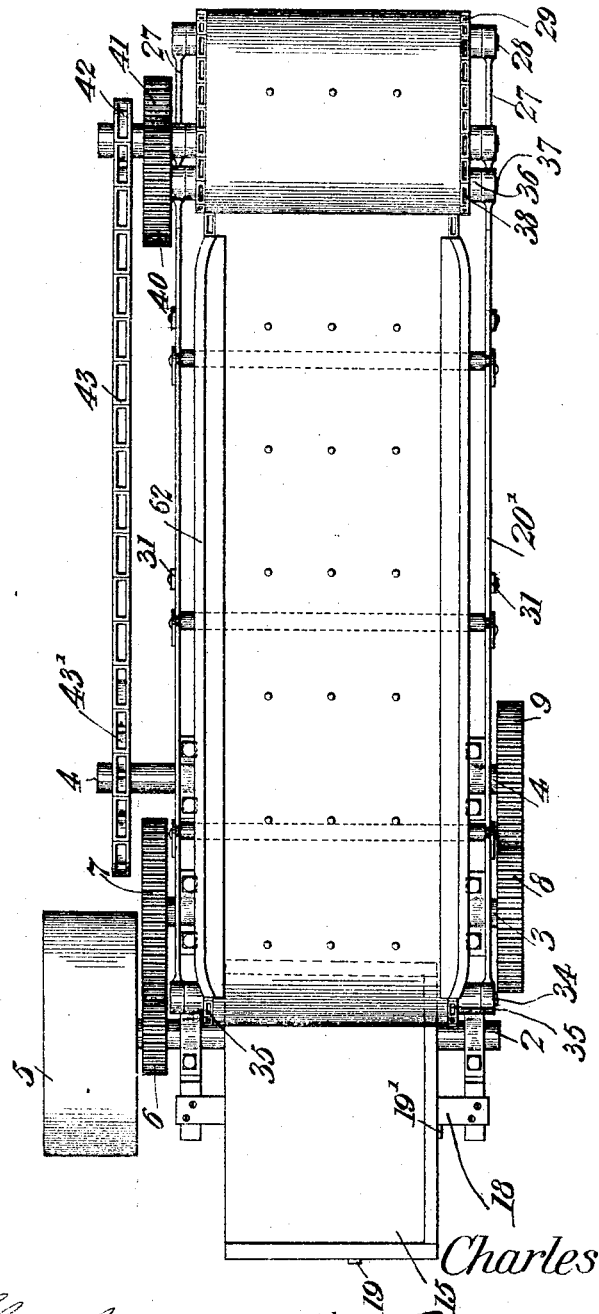

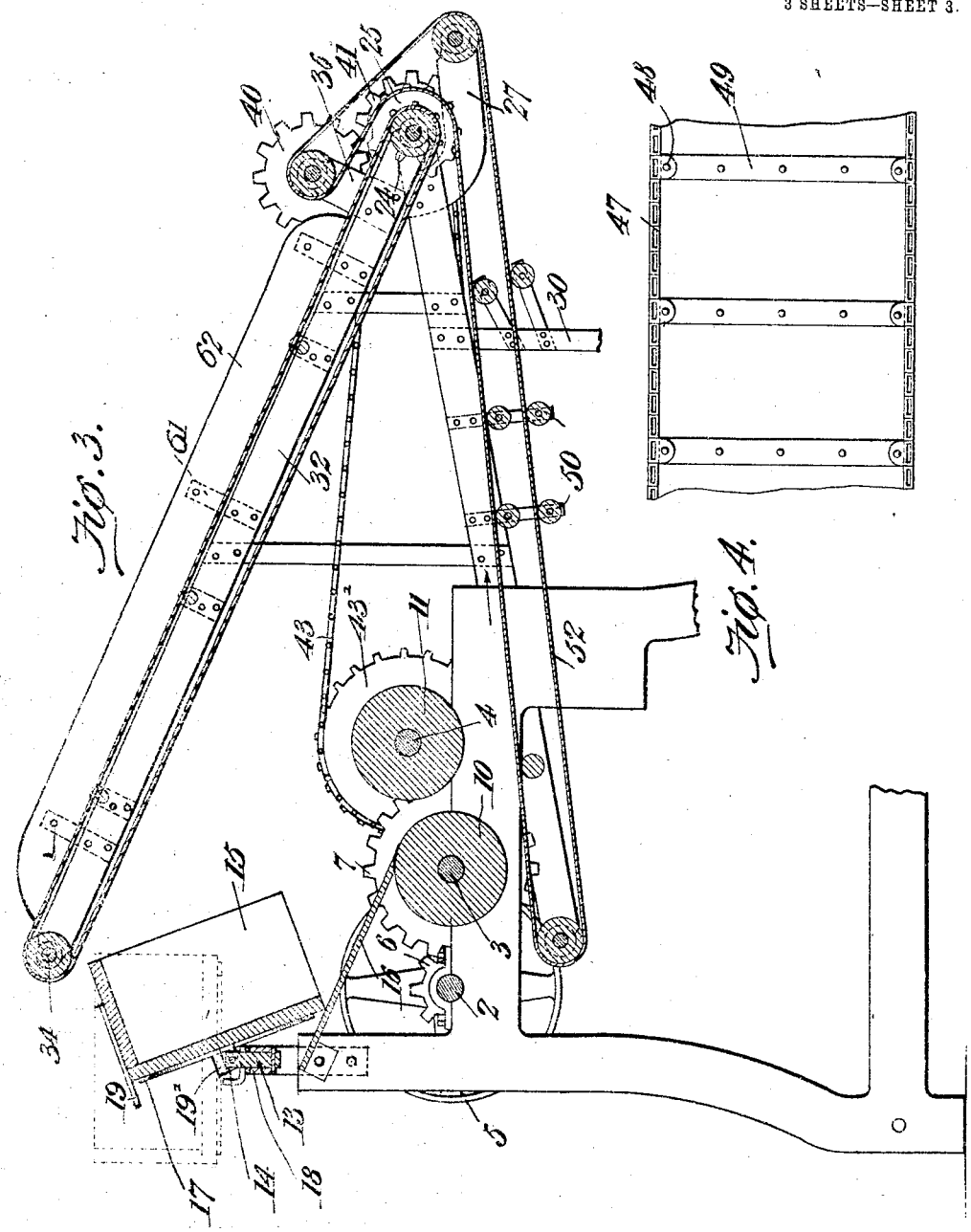

UNITED STATES PATENT OFFICE.

CHARLES JOHN PRANKARD, OF TROY, NEW YORK, ASSIGNOR OF ONE-FOURTH TO ALBERT WILLIAM HAM, OF TROY, NEW YORK.

DOUGH-BRAKE.

SPECIFICATION forming part of Letters Patent No. 767,712, dated August 16, 1904.

Application filed February 1, 1904. Serial No. 191,626. (No model.)

*To all whom it may concern:*

Be it known that I, CHARLES JOHN PRANKARD, a citizen of the United States, residing at Troy, in the county of Rensselaer and State of New York, have invented a new and useful Dough-Brake, of which the following is a specification.

This invention relates to certain improvements in that class of dough-kneading machines in which braking-rolls are applied; and one of its principal objects is to provide a conveying mechanism which will handle dough with a minimum of manual labor and by means of which a single operator may attend to the machine.

A further object of the invention is to provide a device of this character in which the sheet of dough after passing through the braking-rolls is again returned to the dough-box in position to be again fed to the conveyer, and provision is also made for turning the sheet of dough to an extent of ninety degrees, or thereabout, so that the braking operation may be carried on more thoroughly.

A still further object of the invention is to provide a braking apparatus so constructed and arranged that the operator may remove the sheet of dough from the machine to a convenient point with but little exertion.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the drawings, Figure 1 is a side elevation of a dough-brake constructed in accordance with the invention. Fig. 2 is a plan view of the same. Fig. 3 is a longitudinal sectional elevation of the machine on the line 3 3 of Fig. 2, the frame and gearing connections being omitted for the sake of clearness. Fig. 4 is a plan view of one of the conveyer-belts, showing the manner in which the upper edges of the belt are secured to the link belts or cord chains.

Similar numerals of reference are employed to indicate corresponding parts throughout the several figures of the drawings.

In modern dough-making machinery the usual brake-staff has been replaced by rollers, through which the dough is passed, and after the sheet of dough emerges from the rollers it is taken back to the starting-point and after being given a quarter-turn is again passed through the rolls. The dough is usually treated in masses that weigh from thirty-five to fifty pounds each, and the work is so exhausting that, as a rule, two men are employed for each machine, and this is found necessary owing to the fact that the dough is likely to stick during treatment, and while the dough is being pushed through or between the rolls by one workman the other man keeps close watch in readiness to stop the machine in case of accident.

In carrying out the present invention the braking-machine is provided with conveyers so arranged as to turn the sheet of dough to its initial position after each rolling operation and to turn the sheet to the extent of a quarter-revolution and then again start it out the rollers, this operation being repeated until the sheet of dough is in proper condition to be divided into loaves. The mechanism is so arranged that the work of the operator is reduced merely to the placing of the dough in the machine and the removal of the complete sheet therefrom.

The working parts of the apparatus are supported on a suitable frame having bearings for three parallel shafts 2, 3, and 4, the shaft 2 being provided with a belt-wheel 5, which may be operated from any suitable source of power. The shaft 2 further carries a pinion 6, which intermeshes with a gear 7 at one end of the shaft 3, and at the opposite end of said shaft 3 is a gear 8, intermeshing with a gear 9 on the shaft 4. The two shafts 3 and 4 carry, respectively, brake-rolls 10 and 11, between which the dough is passed.

At the feeding end of the machine is arranged a standard 12, in the upper end of which is a pin 13, and at the upper end of the pin is pivoted a lug 14, that carries a dough-box 15, two of the sides of which are removed in order that the dough may be delivered from the box to an inclined plate 16 and from thence directly between the brake-rolls. The bottom of the box 15 is provided with a ring 17, which normally rests on a cross-bar 18, and the box carries two stops 19 and 19', movable alternately against the outer edge of the bar 18 and serving to limit revoluble movement of said dough-box.

When the pivot-pin 13 is turned to the position shown in Fig. 3, the dough-box is free to tilt and dump its contents onto the inclined plate 16; but when turned around at right angles thereto or to the position shown in Fig. 1 the hinge or pivotal connection 14 will prevent tilting movement of the dough-box toward the plate, while movement in a direction at right angles thereto is prevented by the position of the hinge and the engagement of the ring 17 with the cross-bar 18.

At the opposite sides of the main frame are bolted inclined bars 20, that are each provided at one end with bearings for a shaft 21, carrying two sprocket-wheels 22. At the opposite ends of the bars 20 is a shaft 23, carrying two fixed sprocket-wheels 24 and a pair of loose sprocket-wheels 25, the latter being each of a greater diameter than the wheels 24 and revoluble independently on the shaft. The outer ends of the arms 20 are further provided with brackets 27, carrying shaft 28, and to each are secured two sprocket-wheels 29.

The bars 20 are partly supported by standards 30, the lower ends of which are bolted to the floor or any suitable supporting means, and to the outer face of the bars 20 are secured vertical bars 31, which serve as supports for a pair of inclined bars 32, the lower ends of which have openings for the passage of the shaft 23, and said shaft serves as additional support for this pair of bars. At the outer ends of bars 32 are bearings for the reception of shaft 34, carrying a pair of sprocket-wheels 35, and to the lower ends of said bars are secured brackets 36, carrying a shaft 37, on which are mounted sprocket-wheels 38.

On the shaft 37 is a gear-wheel 40, which intermeshes with a gear 41 on the shaft 23, and said shaft 23 is further provided with a sprocket-wheel 42 to receive a link belt 43, that also extends around a larger sprocket-wheel 43' on the shaft 4.

The dough is received from the brake-rolls and is conveyed by a pair of belts back to the dough-box. These belts are formed of canvas or other sheet material, and at the opposite edges thereof are link belts 47. At suitable intervals the links are provided with lugs 48, that are connected to cross-bars 49, and said cross-bars are firmly secured to the canvas belts by means of rivets or other fastening devices, the strips being preferably formed of metal and serving to prevent sagging of the central portion of the box from the weight of the dough. Sagging is further avoided by means of auxiliary belt-carrying rollers 50, arranged at suitable intervals and carried, preferably, by the bars 20 and 30 or by means of suitable brackets secured to said bars.

The lowermost belt 52 is held in place and is operated by sprocket-wheels 22, 25, 38, and 29, the sprocket-wheels 25 serving to change the direction of the upper run of the belt, and the sprocket-wheels 29 perform a similar function for the lower run thereof. The uppermost belt is guided and driven by sprocket-wheels 24 and 35, and the lowermost end of the upper belt is guided and held in such position as to be partly inclosed by the lower belt at the point where the upper run of the latter is turned. Owing to the peculiar arrangement of the gearing connections at this point, the surface speed of the two belts will be the same, and the sheet of dough passing between them will not be subjected to strain or to undue pressure.

To the opposite side plates 32 are secured brackets or strips 51, that form supports for guards 62, arranged at the opposite side of the dough-carrying surface of the upper belt, and similar guards may be placed at the sides of the lower belt, although the side bars 20 may perform this function, owing to the incline of the side bars and the lines of the lower conveying-belt.

In the operation of the device a mass of dough is placed in the dough-box 15, and the box is then tilted to dump its contents onto the inclined plate 16, through which it slides to a point between the brake-rolls. The sheet of dough falls onto the upper run of the lower belt, which is traveling in the direction indicated by the arrow in Fig. 3 and at a speed slightly in excess of the surface speed of the brake-rolls, it being found in practice that the sheet of dough will be slightly stretched as it is received by the belt and be more quickly worked and placed in condition for formation into loaves or other articles. The canvas belts are covered with flour to prevent sticking of the dough, and the latter will be traveled between the upper and lower belts, being turned from the lower end of the upper belt and thence conveyed by the latter upward from the shaft 34 and dumped into the dough-box, which meantime has been carried to horizontal position and turned around to the extent of a quarter of a revolution. With the sheet of dough in the box the workman again turns it to dumping position, so that on the second presentation of the dough to the rolls the sheet will be at a right angle to its first position, and the braking operation may be thus carried on perfectly and without rendering it necessary for the workman to turn the dough by hand. The operation of braking is carried on by passing the dough through the rolls any number of times, and when the sheet is to be finally removed from the machine to be divided into loaves or other articles the workman catches one edge of the sheet as it is leaving the space between the two belts and turns it from the upper shaft 37 and guides it to a suitable table for further treatment.

While the member 15 has been described as a "dough-box," it will be understood that it may be merely in the form of a plain board or platform to receive and turn the sheet of dough, and in some cases the dough-receiving plate may be non-revoluble, the workman turning the sheet to any desired extent before delivery to the braking-rolls. This would dispense with the manual labor involved in carrying the dough back to the feed end of the machine, as now practiced; but it is preferred to employ a table which may be turned in order to minimize the manual labor.

Having thus described the invention, what is claimed is—

1. In a dough-braking machine, a pair of braking-rollers, a tiltable support which may be turned to feed the dough to the rollers, and a continuously-operable conveying means for receiving the dough from the rollers and returning the same to the said support.

2. In a dough-braking machine, braking-rolls, a revoluble dough-support in a plane above the rolls, an endless-belt conveying mechanism for receiving the dough from the rolls and conveying the same to said support.

3. In a dough-braking machine, braking-rolls, a tiltable and revoluble dough-support in a plane above the rolls, an endless-belt conveying mechanism for receiving the dough from the rolls and conveying the same to said support.

4. In a dough-braking machine, a pair of braking-rollers, conveying-belts for receiving and conveying the dough to a point adjacent to the feeding side of the rollers and a revoluble support, serving to receive the dough from said belts.

5. In a dough-braking machine, a pair of braking-rollers, conveying-belts for receiving and conveying the dough to a point adjacent to the feeding side of the rollers, and a tiltable support mounted independently of the belts and serving to receive the dough from said belts.

6. In a dough-braking machine, a pair of braking-rolls, a tiltable support in a plane above the rolls, a supporting-frame on which said table is pivotally mounted, means for limiting turning movement of said table, and a conveying mechanism for receiving the dough from the rolls and delivering it to the support.

7. The combination, with a pair of braking-rolls, of a conveyer-belt for receiving a sheet of dough from the rolls, and mechanism for moving the belt at a speed in excess of the surface speed of the rolls.

8. The combination with a pair of braking-rollers, of a pair of conveyer-belts, one of said belts being guided partly around the other, and independent guiding means for maintaining the belts in spaced relation.

9. The combination with a pair of braking-rolls, of a pair of conveyer-belts, one of said belts being guided partly around the other, and separate means for maintaining the belts in spaced relation.

In testimony that I claim the foregoing as my own I have hereto affixed my signature in the presence of two witnesses.

CHARLES JOHN PRANKARD.

Witnesses:
W. YUNKER,
HERMAN F. AUGER.